H. BAULIG.
MECHANISM FOR TREATING FRUIT JUICE.
APPLICATION FILED AUG. 11, 1919.

1,336,719.

Patented Apr. 13, 1920.
4 SHEETS—SHEET 1.

INVENTOR
Herman Baulig
BY
John D. Morgan
ATTORNEY

H. BAULIG.
MECHANISM FOR TREATING FRUIT JUICE.
APPLICATION FILED AUG. 11, 1919.
1,336,719.  Patented Apr. 13, 1920.
4 SHEETS—SHEET 2.
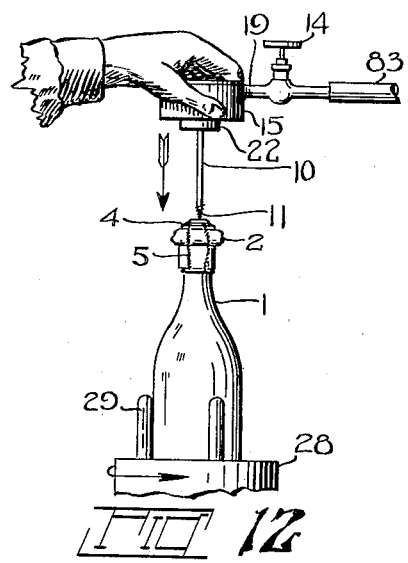
FIG. 12
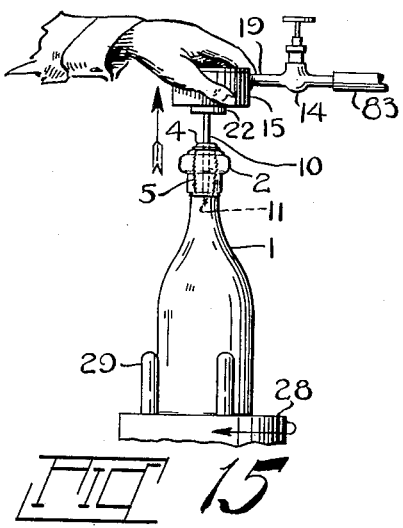
FIG. 15
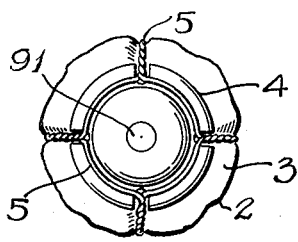
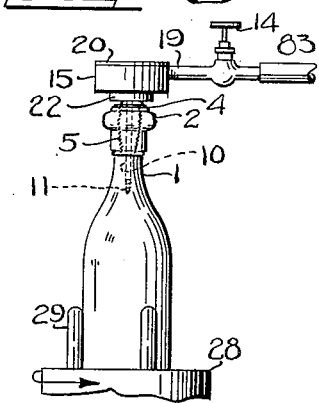
FIG. 13
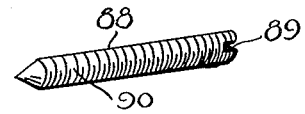
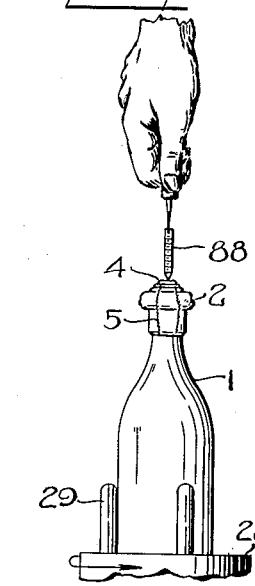
FIG. 14
INVENTOR
Herman Baulig
BY
John D Morgan
ATTORNEY

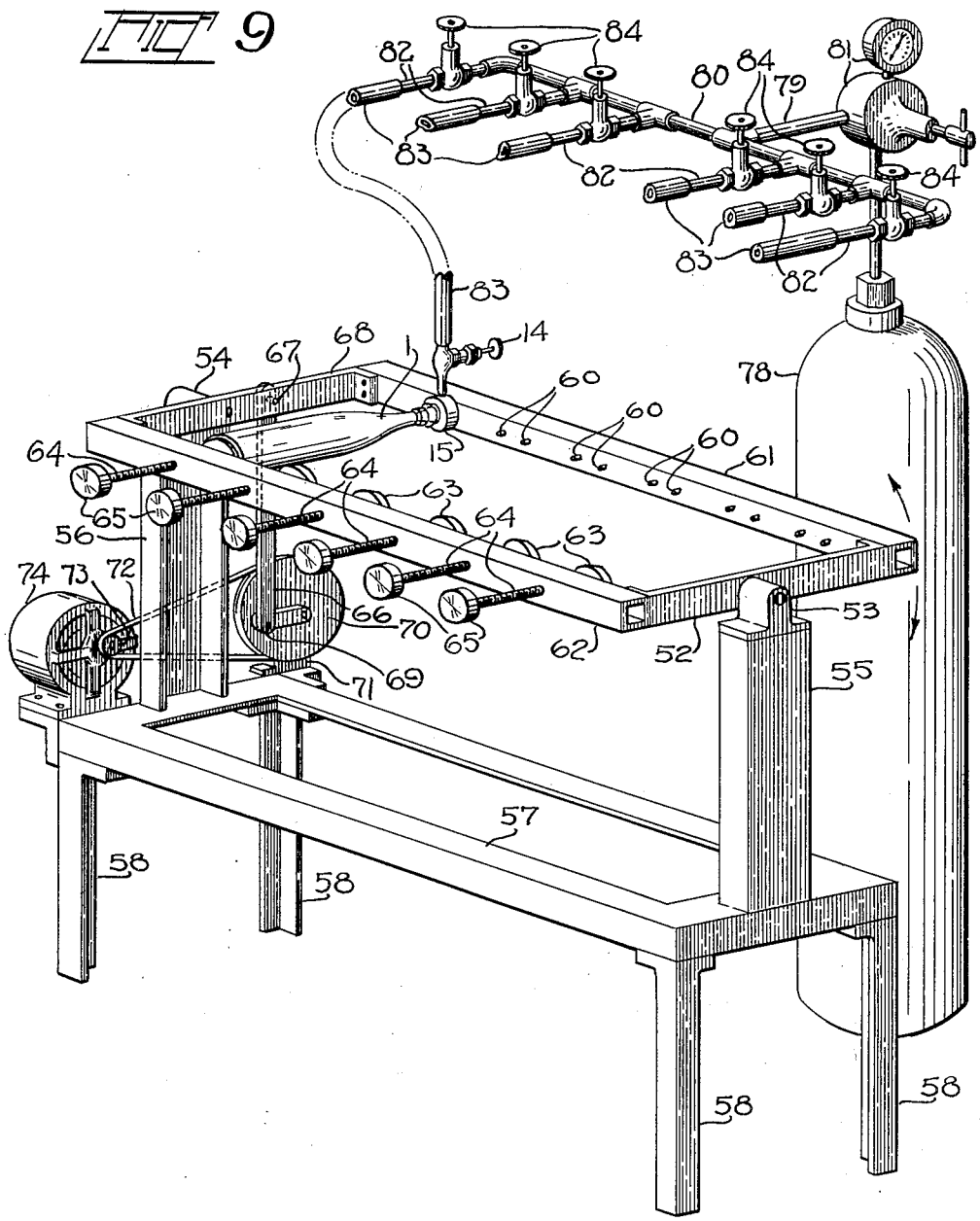

H. BAULIG.
MECHANISM FOR TREATING FRUIT JUICE.
APPLICATION FILED AUG. 11, 1919.
1,336,719.
Patented Apr. 13, 1920.
4 SHEETS—SHEET 4.
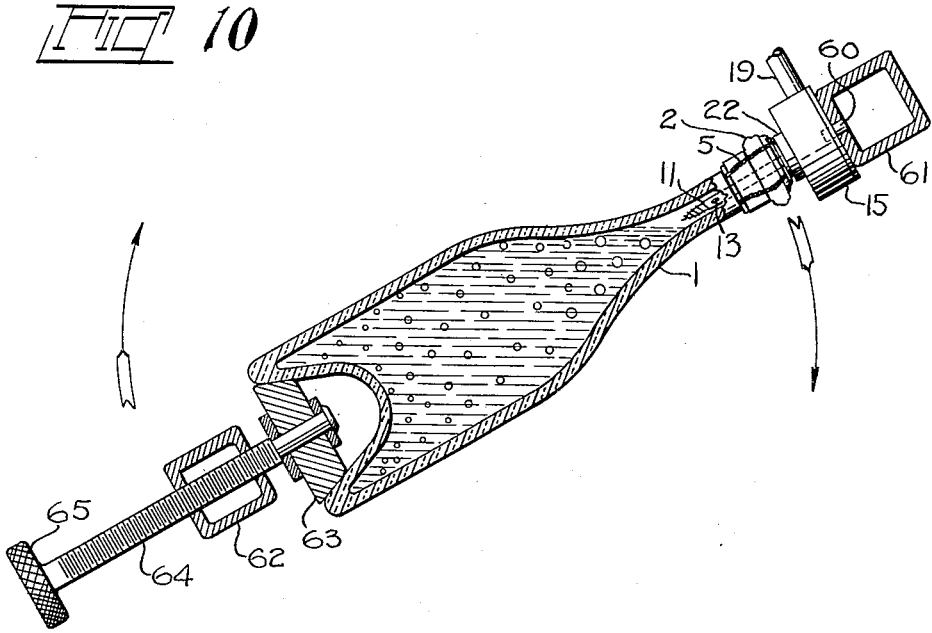
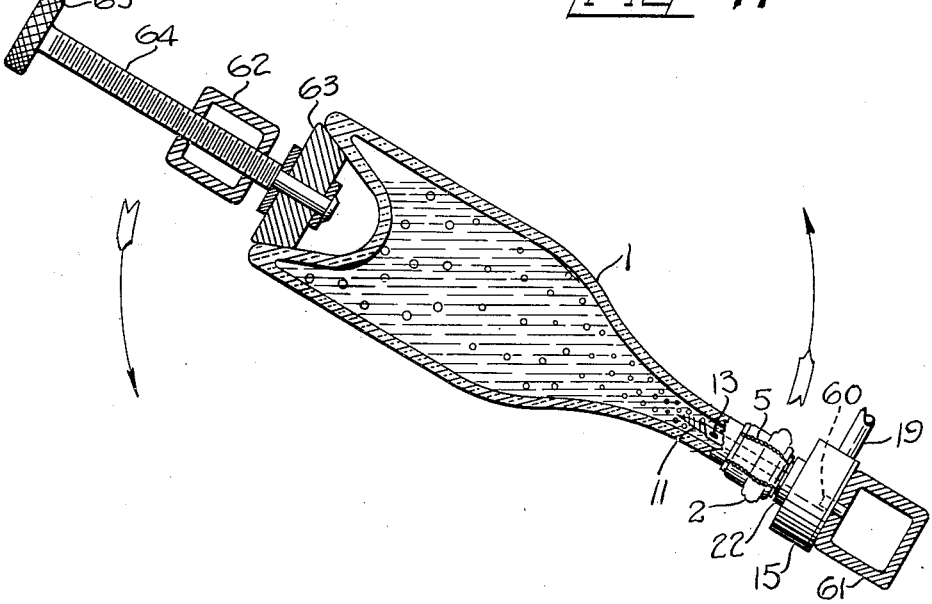

UNITED STATES PATENT OFFICE.

HERMAN BAULIG, OF EGG HARBOR, NEW JERSEY, ASSIGNOR TO H. T. DEWEY & SONS COMPANY, OF NEW YORK, N. Y., A CORPORATION OF NEW YORK.

MECHANISM FOR TREATING FRUIT-JUICE.

1,336,719.  Specification of Letters Patent.  Patented Apr. 13, 1920.

Application filed August 11, 1919. Serial No. 316,747.

*To all whom it may concern:*

Be it known that I, HERMAN BAULIG, a citizen of the United States, residing at Egg Harbor, in the State of New Jersey, have invented certain new and useful Improvements in Mechanism for Treating Fruit-Juice, of which the following is a specification.

The invention relates to a machine for charging fruit juices and other liquids with gas, and more especially charging the fruit juices or other liquids with gas while they are maintained under seal.

Objects and advantages of the invention will be set forth in part hereinafter and in part will be obvious herefrom, or may be learned by practice with the invention; the same being realized and attained through the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description serve to explain the principles thereof.

Of the drawings:

Fig. 7 is a fragmentary elevation showing the manner of introducing the charging mechanism into the sealed bottle;

Fig. 8 is a similar view showing the charging mechanism in position to charge the liquid in the bottle;

Fig. 9 is a perspective view of a mechanism for agitating the bottles during charging;

Figs. 10 and 11, are enlarged sectional views, showing the bottles being rocked during the introduction of gas;

Fig. 12 is a view similar to Figs. 7 and 8, but showing the charging device being withdrawn from the bottle after the liquid is charged;

Fig. 13 shows the resealing plug;

Fig. 14 shows the bottle neck and seal after resealing; and

Fig. 15 is a plan of the bottle seal cap.

The invention as exemplified herein is described as applied to the charging with gas fruit juice while protecting the juice from exposure to fermentation germs or bacilli. In certain of its aspects, the invention is especially designed for this purpose, while in other aspects thereof it is applicable to charging other fluids with gas.

It is highly desirable, and heretofore it has been impossible, to seal a fruit juice container, from which all air has been excluded and the juice in which has been sterilized, and to charge with gas the juice within the sealed container while still protected from the air, and to maintain the container and the juice away from the air until opened for use.

In the exemplified embodiment of the invention, it will be described as applied to the carbonating of sterilized and sealed grape juice. The mechanism for filling the bottles with the grape juice is not shown herein, nor the devices or means for sealing and sterilizing the bottles. Such mechanism, devices and means as such are known and any suitable or approved form thereof may be employed.

The process of charging the fruit juice under seal, and including additional steps, is fully described and claimed in my copending application Ser. No. 316,748, filed on the same day herewith.

Means are provided by the invention for operating upon the so sealed and sterilized bottles of juice and carbonating the juice while maintaining it in sealed condition.

More particularly, a device is introduced through the bottle seal, by and through which device the charging gas is forced into the juice, the device maintaining or keeping effective the seal against the air. After the juice is charged, the charging device is withdrawn, and a resealing plug is immediately introduced, the pressure of gas, during the brief interval, or instant between the withdrawal of the device and the insertion of the plug preventing the entrance of air and the consequent fermentations or other bacillical contamination.

By the invention, the fruit juice is very highly and permanently carbonated, while maintained against ferment infection or contamination, and at the same time maintaining the liquid free from cloudiness or turbidity.

Figure 1:
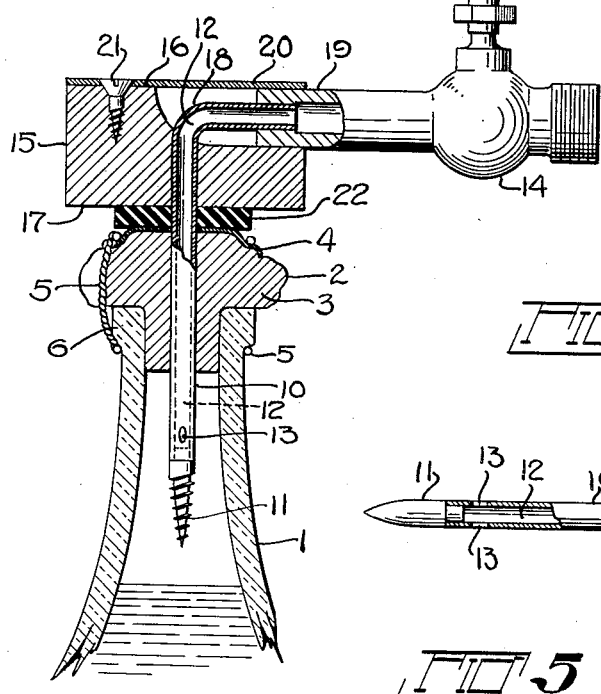
Figure 1 is a fragmentary elevation, with parts in section, of the mechanism for introducing the gas into the sealed bottle.

Referring now in detail to the exemplary embodiment of the accompanying drawings, the bottle or container 1 is shown fragmentarily in Fig. 1, with a seal 2 in the neck thereof of a well-known form. This seal 2 comprises a cork 3 driven or fitted tightly into the bottle neck, with a tin cap or shield 4 on the top thereof. A wire tie 5 passes over the cap 4 and around the shoulder 6 of the bottle neck. This holds the seal firmly against any pressure from within the bottle or container. In the disk or cap 4 is a relatively small opening 91, the present utilization of which will be later described.

The bottle or container 1 is filled with the liquid, such as grape juice, and is heated to the desired temperature for sterilization, and the cork 3 is driven home in the container neck, and the cap 4 placed on, and the seal fastened by the wire tie 5. As the juice cools, a small free space is created in the top of the bottle, which is vacant or free from air, by reason of the seal having been made.

Means are provided, as stated, for carbonating or otherwise charging with gas, the sterilized juice within the bottle while maintaining the seal. In the embodied form thereof a puncturing rod 10 is provided of exterior cylindrical form, filling the opening which it makes in the seal, and having a sharp point. This point may be screw threaded or gimlet pointed, as indicated at 11 in Fig. 1, or it may have a smooth sharp point as indicated at 11ª in Fig. 3. The puncturing conduit 10 has an internal longitudinal gas conduit 12, this internal conduit constituting the passage way through which the gas is forced into the liquid. This passage way 12 has exit orifices 13 near its inner or pointed end thereof through which orifices the gas passes from the passage way 12 into the juice.

Means are provided by the invention, cooperating with the devices just described, for maintaining the seal and coincidently or simultaneously admitting or forcing in the gas, and as embodied a reservoir of gas under pressure is provided and pipe connections therefrom to the puncturing conduit 10, and a valve 14, which closes the passage way 12, and when opened, turns on the gas under pressure.

Figure 2:
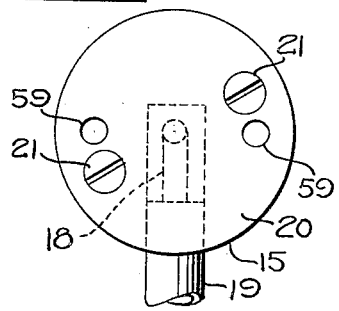
Fig. 2 is a top plan, corresponding to Fig. 1.
Figure 3:
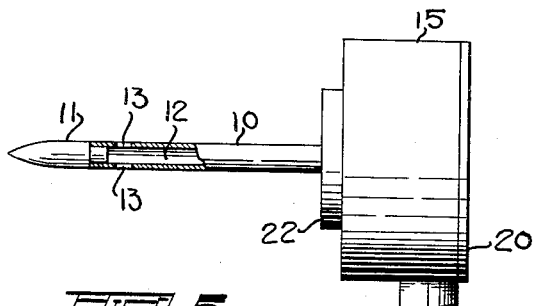
Fig. 3 is a fragmentary elevation, looking at Fig. 2 from the left, and at Fig. 1 from the front, and showing a somewhat different form of the device.

Means are also provided therewith especially adapted to facilitate the rapid and efficient handling of the mechanism in actual practice. As embodied, a body or hand-piece 15 of cork, or other suitable material is provided, the conduit 10 passing therewithin, as shown in Figs. 1 and 2. Conduit 10 may be regarded as entering the body 15 at its bottom, and the body may have a flat top 16 and a flat bottom 17 and have its side walls circular (Figs. 1, 2 and 3).

Conduit 10 has preferably an elbow bend 18 within the body 15 and at its outer end it is fixed to, and communicates with, a pipe 19, in or connected with which is the valve 14 previously referred to. The body 15 is hollowed to fit the pipe 19, and a capping or retaining plate 20 fits over the top of the body or hand piece 15. This plate 20 is fastened in a suitable way, as by screws 21. On the bottom of the hand piece 15 and around the conduit 10, if desired, is fitted a rubber or other yielding cushion disk 22, which assists in making a tight joint on the top of the bottle seal.

The body 15 makes an excellent and convenient hand piece, whereby the operator can hold the device in his hand, and direct and position the pointed conduit 10, and with the valve 14 at hand convenient for manipulation.

Figure 4:
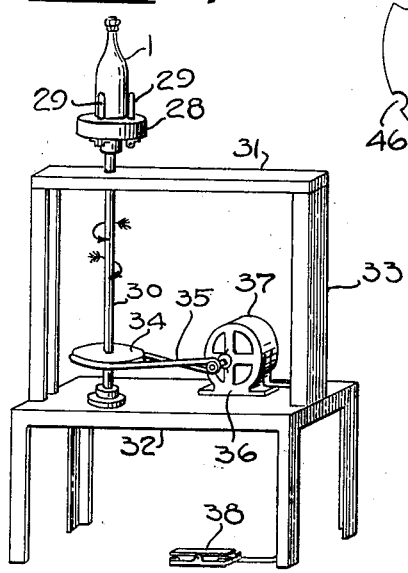
Fig. 4 is an elevation, on a diminished scale, of the bottle rotating device.

To facilitate the introduction or passage through the seal 2 of the puncturing conduit 10, means are provided in the present preferred embodiment for rotating or whirling the sealed bottle, although the member 10 could be inserted without rotating the bottle, if so desired. As embodied, a bottle support 28 (Fig. 4) is provided, having a plurality of bottle holding fingers 29, which fingers clasp the bottle placed therewithin, as shown in Fig. 4.

Bottle support 28 is fixed on top of a shaft 30, journaled in reaches 31 and 32 of a frame 33. Fixed on shaft 30 is a pulley 34, over which pulley passes a belt 35. Belt 35 also runs over a small pulley 36 fixed on the shaft of the motor 37. Motor 37 is supported on the reach 32 of the frame 33, and is provided with a pole or direction reversing switch 38, which is arranged in Fig. 4 for foot operation.

Figure 5:
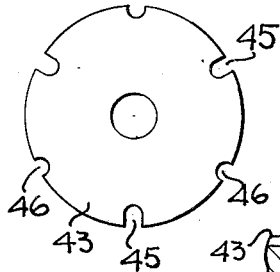
Fig. 5 is a detail plan, on an enlarged scale, of the device for adjusting the rotating mechanism to bottles of various sizes.
Figure 6:
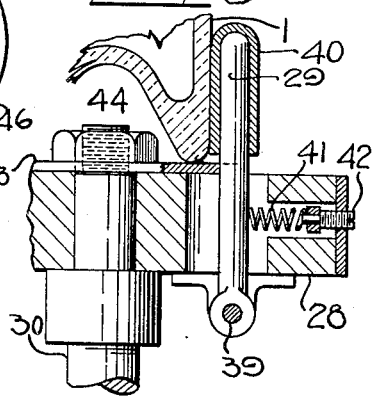
Fig. 6 is a fragmentary sectional elevation, on an enlarged scale, of one of the bottle holding fingers.

Means are provided for automatically adapting the bottle holder 28 to large and small bottles, such as quarts and pints. As embodied (Figs. 4, 5 and 6), the fingers 29 are pivotally mounted at 39 on the support 28, and are preferably rounded at their tops and are provided with non-slip devices such as covers 40, of leather or other relatively frictional material. Each finger 29 is resiliently pressed inwardly and, as embodied, a spring 41 presses against each finger, and each spring is preferably provided with an adjusting screw 42.

A gaging disk 43 fits upon the support 28, and is held in position by a nut 44. In the edges of gaging disk 43 are two series 45 and 46 of recesses, one set being relatively shallow and the other set being relatively deep, the recesses of each group corresponding in number to the fingers 29. The gaging disk 43 is placed within fingers 29, with either set of recesses receiving the fingers. The springs 41 press the fingers resiliently into the inner end of the grooves. In the deep recesses or grooves the fingers grasp tightly a small bottle and in the shallow recesses, the fingers grasp tightly a large bottle.

By reason of the rounded tops of fingers 29, when a bottle of the proper size is pressed down therebetween, the fingers will open slightly to let the bottle down until the bottom rests on the support 28. The fingers grasp the bottle tightly with spring pressure, and the leather tips 40 will hold the bottle tightly and cause it to rotate with support 28. Thus the bottles may be merely pressed in and lifted out from the holding fingers 29 practically instantly, and will be firmly held and rotated while on the support.

By angularly shifting the gage plate 43 to bring the different sets of recesses into coöperation with fingers 29, the support will take and hold the different sizes of bottles without change or adjustment in the other parts of the mechanism.

The manner of operation of the mechanism described is substantially as follows:

The bottle 1 is placed on the support 28 in the manner described in connection with the structure of the fingers 29, and as shown in Fig. 4. The operator grasps the hand piece 15 and holds the piercing conduit 10 pointed downwardly vertically over the hole in cap 4 of the seal. By stepping on the proper end of switch 38, the bottle is rapidly rotated and the member 10 passes through cork 3 and down within the bottle to the position shown in Fig. 1.

By turning valve 14, the gas under pressure is forced into the bottle and its contents. After the juice is charged, valve 14 is closed, the operator steps on the other end of swhitch 38, the bottle is thereby rotated in the opposite direction, and the conduit 10 is thereby withdrawn from the seal. With the plain pointed member, as shown in Fig. 3, the bottle is not necessarily rotated in both directions, but may be rotated in one direction only, if so desired. In such case a simple switch or other starting device may be used instead of pole reversing switch 38.

The manner of preventing ingress of air after charging the contents and of resealing the bottle will be described hereinafter.

In accordance with one feature of the invention, and in the present preferred embodiment, means are provided for agitating the juice in the bottle during the charging operation, and preferably for oscillating the bottle so that the top and then the bottom of the bottle or container are alternately uppermost, the gas thus bubbling through the sealed liquid alternately in opposite directions, as shown in Figs. 10 and 11 of the drawings.

In the embodied form of means for so mixing the gas and liquid under seal (Fig. 9), an oscillating, power operated bottle carrying frame is provided, adapted to carry a plurality of bottles. As embodied, a rectangular frame 52 is pivotally journaled at 53 and 54 upon frame uprights 55 and 56, which are supported on a horizontal frame 57, which in turn is supported on four legs 58.

Frame 52 is provided with means whereby the bottles or containers 1 with the sealed gas supplying devices connected thereto may be quickly and easily placed within the frame, oscillated during charging and then as quickly and easily removed. As embodied, the handpiece 15 which is attached to the bottle, as described, is provided with depressions 59 into which pass pins 60 which are mounted in reach or side 61 of frame 52. By using two pins 60 and two depressions 59, the bottle or container is firmly held against rotation.

In the opposite reach 62 of frame 52 are devices for engaging, firmly holding, and for releasing the bottles and also adaptable, like the bottle whirling devices, to take bottles or containers of different sizes. As embodied, a conical clamping block 63 is shaped to fit the bottom of the bottle, and to enter the usual recess or concavity in the bottom of the bottles when bottles of that form are used. A clamping block 63 is mounted on the inner end of a screw threaded rod 64. Rod 64 is screw threaded through the reach or side 62 of frame 52, and is provided with a hand wheel 65. The holders for both ends of the bottles or containers are preferably arranged in sets along the reaches 61 and 62 of the frame 52, and a group or battery of bottles or containers are oscillated and charged together.

The embodied form of oscillating means for frame 52 (Fig. 9) comprises a rod 66, pivoted at 67, to the reach 68 of frame 52, and also eccentrically pivoted at 69 to the side of a pulley 70. Pulley 70 is journaled on a block 71, mounted on frame 57. A belt 72 runs over pulley 70 and over a small pulley 73, fixed on the shaft of a motor 74. Thus, the motor through rotation of pulley 70 oscillates the frame 52 and therewith the battery of bottles or containers held thereby.

The embodied form of charging mechanism, additional to that already described, comprises one or more containers 78 for the compressed gas, which may be of usual or suitable form and mechanism, one such container being shown in Fig. 9. A pipe 79 connects from the container 78 to a distributing pipe 80. Suitable pressure regulating or reducing, and indicating devices 81 may be employed, and may be of known or standard form, and need not be described in detail. From the distributing pipe 80, pipes 82 connect by hose or other flexible connections 83 to the valves 14 already described. Pipes 82 are provided with valves 84.

The manner of operation of the mechanism, except as already described, is substantially as follows:

The bottle rotating mechanism of Fig. 4 is located adjacent to frame 52, and one of the seal piercing and gas conducting devices is connected to the end of each flexible pipe 83. The seal piercing device 10 is put through the seal of a bottle on the support 28, as already described, and the bottle is then placed in frame 52, with the holes 59 of hand piece 15 in line with the pins 60 of the frame.

The hand wheel 64 is then turned to bring clamping block 63 against the bottom of the bottle or container 1, which is thus firmly held in place.

These operations are repeated until the frame 52 is full of bottles or containers 1. The valves 14 and 84 are manipulated to turn on the gas, and motor 74 is operated to oscillate frame 52. When the charging operation is completed, the gas is shut off, frame 52 is stopped, and the bottles or containers 1 are removed from frame 52 by turning hand wheels 64.

The seal piercing and gas conducting devices 10 are then removed from the bottles. This may be done by placing the bottles on the support 28 and turning or whirling them in the opposite direction, as already described. When the conduit 10 comes out of the bottle seal, the pressure within the bottle immediately forces the gas out through the opening in seal 3 formed by the gas conduit 10 and prevents ingress of any air. This opening is then immediately and permanently sealed to both hold in the gas and to maintain the seal against air access.

As embodied, there is provided a plug 88, of fiber or other insoluble and flavorless material, which is immediately forced home in the opening 91 in the seal 3. Plug 88 may have a slot 89 in its head, and may be screw threaded along its length, as shown at 90. If desired, while the bottle or container 1 is still on support 28 and immediately after the seal piercing and gas conducting member 10 is removed from the seal 3, the plug 88 is at once inserted. For this purpose a holding device or blade may be placed in slot 89 and the support 28 and the container 1 rotated while the plug 88 is pressed or screwed home. The plug 88 may then be cut off flush with the exterior face of the seal, and the charged, air free and air tight, sterilized juice is permanently sealed.

The invention in its broader aspects is not limited to the details of construction shown and described, but changes may be made therein without departing from the principles of the invention and without sacrificing its chief advantages.

What I claim is:

1. A device for charging with gas a fluid in sealed bottles including in combination a seal piercing and gas introducing member, and mechanism for imparting a relative rotation between the bottle and the piercing member for facilitating the piercing of the seal.

2. A device for charging with gas the fluid in sealed bottles including in combination a seal piercing and gas introducing member and means for rotating the bottle to facilitate the piercing of the seal.

3. A device for charging with gas the fluid in sealed bottles including in combination a seal piercing and gas introducing member and means for rotating the bottle in opposite directions to facilitate the piercing of the seal, and the subsequent removal of the piercing member.

4. A device for charging with gas the fluid in sealed bottles including in combination a seal piercing and gas introducing member, a supply of gas under pressure, a conduit between the gas supply and the seal piercing and gas introducing member and means for whirling the bottle to facilitate the piercing of the seal.

5. A device for charging with gas the fluid in sealed bottles including in combination a seal piercing and gas introducing member, a supply of gas under pressure, a conduit between the gas supply and the seal piercing and gas introducing member and means for whirling the bottle in opposite directions to facilitate the piercing of the seal and the subsequent removal of the piercing member.

6. A device for charging with gas the fluid in sealed bottles including in combination a cylindrical pointed rod having an inner longitudinal aperture terminating in an opening near the point and gas supplying connections from the other end of said aperture and means for rotating the bottle about its own center while the pointed rod is being pressed into the seal.

7. A device for charging with gas the fluid in sealed bottles including in combination a cylindrical pointed rod adapted to pierce a bottle seal and to fill the hole made in the seal and having an inner longitudinal aperture terminating in an opening near the point and gas supplying connections from the other end of said aperture and means for rotating the bottle about its own center while the pointed rod is being pressed into the seal.

8. A device for charging with gas the fluid in sealed bottles including in combination a cylindrical pointed rod having an inner longitudinal aperture terminating in an opening near the point and gas supplying connections from the other end of said aperture and means for rotating the bottle about its own center while the pointed rod is being pressed into the seal, and for rotating the bottle in the opposite direction while the pointed rod is being withdrawn.

9. A device for charging with gas the fluid in sealed bottles including in combination a cylindrical pointed rod having an inner longitudinal aperture terminating in an opening near the point and gas supplying connections from the other end of said aperture and means for holding bottles of various sizes and for rotating the bottle about its own center while the pointed rod is being pressed into the seal.

10. A bottle holding device having a plurality of bottle embracing fingers, means laterally spring pressing said fingers, and a gage plate coöperating with said fingers to adapt them to receive and hold bottles of different sizes.

11. A bottle holding device having a plurality of bottle embracing fingers, means laterally spring pressing said fingers shaped to be pressed outwardly by a bottle placed therebetween and a gage plate limiting the inward movement of the fingers.

12. A bottle holding device having a plurality of bottle embracing fingers, means laterally spring pressing said fingers shaped to be pressed outwardly by a bottle placed therebetween and a gage plate limiting the inward movement of the fingers, the gage plate being movable to vary the limiting movement of the fingers for bottles of different diameters.

13. A device for charging with gas a fluid in sealed bottles including in combination a hand piece, a hollow pointed seal piercing member extending from the lower face of said hand piece, a pipe extending from the side of said hand piece and connected to said piercing member for supplying a gas through said piercing member to the contents of the bottle, said top portion of the hand piece being flat and free from obstruction whereby pressure may be applied thereto directly in line with the piercing member.

14. A device for charging with gas a fluid in sealed bottles including in combination a hand piece, an L-shaped hollow pointed seal piercing member extending downwardly from said hand piece, said hand piece having a recess for the upper portion of said piercing member, and a plate secured to the upper face of said hand piece for closing said recess.

15. A device for charging with gas a fluid in sealed bottles including in combination a hand piece, an L-shaped hollow pointed seal piercing member extending downwardly from said hand piece, said hand piece having a recess for the upper portion of said piercing member, a plate secured to the upper face of said hand piece for closing said recess, and a valved pipe secured to the hand piece and engaging said hollow piercing member for supplying gas through said member to the bottle.

16. A device for charging with gas a fluid in sealed bottles including in combination a hand piece, a hollow pointed piercing member projecting downwardly centrally from said hand piece, a rubber washer surrounding said hollow member and adapted to engage the lower face of the hand piece and the seal of the bottle, said hand piece having a radial recess formed therein, said piercing member being bent at right angles and having its upper portion extending radially of the hand piece in said recess, a pipe connected to the upper end of said piercing member in said radial recess, and a valve in said pipe.

HERMAN BAULIG.